United States Patent
Inoue et al.

(10) Patent No.: US 6,271,290 B1
(45) Date of Patent: Aug. 7, 2001

(54) POLYCARBONATE RESIN COMPOSITION FOR OPTICAL USE

(75) Inventors: Kazushige Inoue; Hiromi Ishida, both of Moka (JP); Theodorus Lambertus Hoeks, Bergen op Zoom; Lennard Alexander Markestein, Hendrik Ido Ambacht, both of (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/455,834

(22) Filed: Dec. 6, 1999

(30) Foreign Application Priority Data

Dec. 8, 1998  (JP) .................................................. 10-348852

(51) Int. Cl.⁷ ................................. C08K 3/32; C08K 5/42
(52) U.S. Cl. .......................... 524/145; 524/147; 524/151; 524/156; 524/157; 524/158; 524/317; 524/414
(58) Field of Search ..................................... 524/156, 157, 524/158, 317, 414, 145, 147, 151

(56) References Cited

U.S. PATENT DOCUMENTS

| 5,364,926 | 11/1994 | Sakashita et al. . |
|---|---|---|
| 5,418,269 | 5/1995 | Ishiwa et al. . |
| 5,502,153 | 3/1996 | Sakashita et al. . |
| 5,606,007 | 2/1997 | Sakashita et al. . |
| 6,136,945 | * 10/2000 | Mestanza . |

FOREIGN PATENT DOCUMENTS

| 0435124 | 7/1991 | (EP) . |
|---|---|---|
| 0520805 | 12/1992 | (EP) . |
| 0561638 | 9/1993 | (EP) . |
| 0905178 | 3/1999 | (EP) . |
| 92-175368 | 6/1992 | (JP) . |
| 92-328156 | 11/1992 | (JP) . |
| 5017696 | 1/1993 | (JP) . |
| 93-239334 | 9/1993 | (JP) . |
| 93-262969 | 10/1993 | (JP) . |
| 92-81457 | 10/1997 | (JP) . |
| 10060247 | 3/1998 | (JP) . |

OTHER PUBLICATIONS

European Search Report for Application No. EP 00 30 4167.

* cited by examiner

Primary Examiner—David J. Buttner

(57) ABSTRACT

The present invention provides a method for making a polycarbonate composition. The polycarbonate is prepared by melt synthesis using a sulfur-containing acid compound to at least partially quench the melt catalyst. The polycarbonate composition comprises said polycarbonate, phosphorous acid, further sulfur-containing acid compound and an ester derived from a mono-fatty acid and a polyhydric alcohol.

5 Claims, No Drawings

POLYCARBONATE RESIN COMPOSITION FOR OPTICAL USE

BACKGROUND OF THE INVENTION

The present application is a U.S. non-provisional application based upon and claiming priority from Japanese Application No. HEI 10-348852 is hereby incorporated by reference.

The present invention concerns a polycarbonate resin for optical use, and more specifically concerns a polycarbonate resin for optical use that has excellent color tone stability and forming properties, and is particularly suited for the substrates of optical disks.

Polycarbonate has excellent mechanical properties such as impact resistance, and it also has excellent heat resistance and transparency; therefore, it is widely used for the parts of many kinds of machines and equipment, optical disks, automobile parts, etc. Research has been conducted extensively in great anticipation of its application to optical uses, particularly optical disks for memory storage, optical fibers, lenses, etc.

Well-known methods for manufacturing polycarbonate include a process in which a bisphenol such as bisphenol A is reacted directly with phosgene (interface method) and a process in which a bisphenol such as bisphenol A undergoes a melt polycondensation reaction with a carbonic acid diester such as diphenyl carbonate (ester substitution reaction).

Among these methods, the interface method that uses phosgene requires large quantities of solvent such as methylene chloride, and because the removal of the chlorine is extremely difficult, the polycarbonate produced is not always satisfactory for optical use.

On the other hand, one advantage of the melt polycondensation reaction method is that polycarbonate can be manufactured relatively inexpensively compared with the interface method. Moreover, because it does not utilize toxic substances such as phosphene or large quantities of a solvent such as methyl chloride, it shows great promise as a manufacturing method for polycarbonate for optical use.

However, a polycarbonate resin composition that can be used for optical applications must have excellent color tone stability and not be discolored by heating during the forming process.

The addition of various types of phosphorous acid ester compounds to the polycarbonate has been proposed in JP Kokai 98-60247 and JP Kokai 92-81457 as attempts to improve the color tone stability of polycarbonate during the forming process, but both these procedures concern polycarbonate that is obtained by the interface method that utilizes phosgene, and when these procedures were applied without modification to the melt polycondensation method, sufficient improvement in the color tone stability of the polycarbonate resin could not be obtained.

Therefore, the applicants have discovered that a polycarbonate with improved color tone stability can be obtained by the addition of an acidic compound to the reaction product obtained in a melt polycondensation process, and have proposed this solution in JP Kokai 92-175368, JP Kokai 92-328156, and JP Kokai 93-262969.

However, although these kinds of polycarbonate resins have color tone stability at relatively low temperatures, they are not always satisfactory for applications that require excellent color tone stability and working properties at higher temperatures such as the high density DVD and DVD-R disks that have been developed in recent years, and therefore an improvement was needed.

The inventors considered this problem carefully, and after diligent research discovered that a polycarbonate resin composition with excellent color tone stability at high temperatures can be obtained by the further addition of a specified amount of acidic compound when various types of lubricants are blended into the polycarbonate, thus completing the present invention.

BRIEF SUMMARY OF THE INVENTION

The present invention provides a manufacturing method for a polycarbonate for optical use that has excellent color tone stability and working properties at high temperatures.

The polycarbonate resin composition for optical use in the present invention comprises (A) polycarbonate, (B) phosphorous acid, (C) a sulfur-containing acidic compound or its derivative with a pKa of less than 3, and (D) an ester derived from a mono-fatty acid of 10 to 22 carbon atoms and a polyhydric alcohol.

DETAILED DESCRIPTION OF THE INVENTION

The polycarbonate resin for optical use comprises:

(A) a polycarbonate obtained by the addition of 0.1 to 4.5 ppm of a sulfur-containing acidic compound, or its derivative having a pKa of less than 3, to the reaction product obtained by melt polycondensation of bisphenol and a carbonic acid diester in the presence of an alkaline catalyst. After preparation, the following further ingredients are blended together with the reaction product:

(B) Phosphorous acid, (C) A sulfur-containing acidic compound or its derivative having a pKa of less than 3, and (D) An ester derived from a mono-fatty acid of 10 to 22 carbon atoms and a polyhydric alcohol.

The proportions of ingredients are as follows. With respect to the polycarbonate constituent (A), the content of the phosphorous acid constituent (B) is 0.1 to 10 ppm, the content of the acidic compound constituent (C) is 0.1 to 3 ppm, and the content of the ester constituent (D) is 50 to 1000 ppm.

The polycarbonate resin composition for optical use preferably contains 10 to 1000 ppm of constituent (E), at least one type of compound selected from a group consisting of phosphorous acid ester and trimethyl phosphate.

The polycarbonate resin composition for optical use preferably contains 50 to 500 ppm of constituent (F), an ester derived from a mono-fatty acid of 8 to 22 carbon atoms and polyethylene glycol.

The polycarbonate resin composition in the present invention is explained below in specific terms.

Constituent A: Polycarbonate

The polycarbonate used in the present invention is obtained by the addition of 0.1 to 4.5 ppm of a sulfur-containing acidic compound or its derivative with a pKa of less than 3 to the reaction product obtained by the polycondensation of a bisphenol and a carbonic acid diester in the presence of an alkaline catalyst.

No particular restriction is placed on the bisphenol, and it is represented, for example, by Formula [I] below.

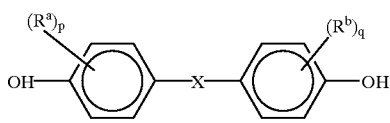

(Wherein, $R^a$ and $R^b$ represent the same or different halogen atoms or single-bonded hydrocarbon groups. Items p and q are integers from 0 to 4. X represents the group

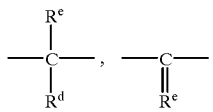

in which $R^c$ and $R^d$ are hydrogen atoms or single-bonded hydrocarbon groups, $R^c$ and $R^d$ may have a cyclic structure, and $R^e$ is a double-bonded hydrocarbon group.)

For the bisphenol shown in Formula [I], specific examples include bis (hydroxyaryl) alkanes such as 1,1-bis (4-hydroxyphenyl) methane, 1,1-bis (4-hydroxyphenyl) ethane, 2,2-bis (4-hydroxyphenyl) propane (hereinafter referred to as bisphenol A), 2,2-bis (4hydroxyphenyl) butane, 2,2-bis (4-hydroxyphenyl) octane, 1,1-bis (4hydroxyphenyl) propane, 1,1-bis (4-hydroxyphenyl) N-butane, bis (4-hydroxyphenyl) phenylmethane, 2,2-bis (4-hydroxy-1-methylphenyl) propane, 1,1-bis (4-hydroxy-t-butylphenyl) propane, 2,2-bis (4hydroxy-3-bromophenyl) propane, etc., and bis (hydroxyaryl) cycloalkanes such as 1,1-bis (4-hydroxyphenyl) cyclopentane, 1,1-bis (4-hydroxyphenyl) cyclohexane, etc.

In the present invention, bisphenols in which X in the above formula represents —O—, —S, —SO— or —SO$_2$ include, for example, bis (hydroxy diaryl) ethers such as 4,4'-dihydroxy diphenyl ether, 4,4'-dihydroxy-3,3'-dimethyl diphenyl ether, etc., bis (hydroxy diaryl) sulfides such as 4,4'-dihydroxy diphenyl sulfide, 4,4'-dihydroxy-3,3'-dimethyl diphenyl sulfide, etc., bis (hydroxy diaryl) sulfoxides such as 4,4'-dihydroxy diphenyl sulfoxide, 4,4'-dihydroxy-3,3'-dimethyl diphenyl sulfoxide, etc., and bis (hydroxy diaryl) sulfones such as 4,4'-dihydroxy diphenyl sulfone, 4,4'-dihydroxy-3,3'-dimethyl diphenyl sulfone, etc.

Moreover, the types of bisphenols shown in Formula [II] below may also be used.

(wherein, $R^f$ is a halogen atom, or a hydrocarbon or halogen-substituted hydrocarbon group of 1 to 10 carbon atoms, and n is an integer of 0 to 4. When n is 2 or more, the $R^f$ substituents may be the same or different.)

For the bisphenols shown in Formula [II], specific examples include resorcinol and substituted resorcinols such as 3-methyl resorcinol, 3-propyl resorcinol, 3-butyl resorcinol, 3-t-butyl resorcinol, 3-phenyl resorcinol, 3-cumyl resorcinol, 2,3,4,6-tetrafluoro resorcinol, 2,3,4, 6tetrabromo resorcinol, etc., catechol, hydroquinone and substituted hydroquinones such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, etc.

In addition, 2,2,2',2'-tetrahydro-3,3,3',3'-tetramethyl-1,1'-spiro-bis-[IH-indene]-6,6'-diol shown in the following formula may be used for the bisphenol.

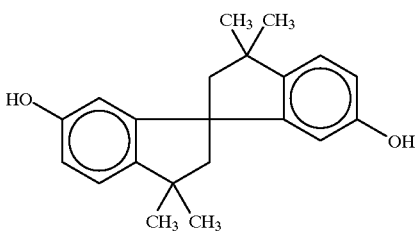

Among these, the bisphenol shown in Formula [I] above is preferred, and bisphenol A is especially preferred.

For the carbonic acid diester, specifically, diphenyl carbonate, ditolyl carbonate, bis (chlorophenyl) carbonate, m-cresyl carbonate, dinaphthyl carbonate, bis (diphenyl) carbonate, diethyl carbonate, dimethyl carbonate, dibutyl carbonate, dicyclohexyl carbonate, etc., may be used and two or more of these substances may be used together. Among these substances, diphenyl carbonate is especially preferred.

Dicarboxylic acid or dicarboxylic acid ester may be contained in these kinds of carbonic acid diesters. Specifically, the carbonic acid diester shall contain 50 mol % or less, and preferably 30 mol % or less dicarboxylic acid or dicarboxylic acid ester.

For this kind of dicarboxylic acid or dicarboxylic acid ester, aromatic dicarboxylic acids such as terephthalic acid, isophthalic acid, diphenyl terephthalic acid, diphenyl isophthalic acid, etc.; aliphatic dicarboxylic acids such as succinic acid, glutaric acid, adipic acid, pimelic acid, suberic acid, azelaic acid, sebacic acid, decanedioic acid, dodecanedioic acid, diphenyl sebacic acid, diphenyl decanedioic acid, diphenyl dodecanedioic acid, etc.; and alicyclic dicarboxylic acids such as cyclopropane dicarboxylic acid, 1,2-cyclopropane dicarboxylic acid, 1,3-cyclopropane dicarboxylic acid, 1,2-cyclopentane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, diphenyl cyclopropane dicarboxylic acid, diphenyl 1,2-cyclopropane dicarboxylic acid, diphenyl 1,2-cyclobutane dicarboxylic acid, diphenyl 1,2-cyclopentane dicarboxylic acid, diphenyl 1,3-cyclopentane carboxylic acid, diphenyl 1,2-cyclohexane dicarboxylic acid, diphenyl 1,3-cyclohexane dicarboxylic acid, diphenyl 1,4-cyclohexane dicarboxylic acid, etc., may be included. The carbonic acid diester may comprise 2 or more types of these dicarboxylic acids or dicarboxylic acid esters.

In the present invention these carbonic acid diesters may be pre-filtered with a filter while they are in the molten state. By this kind of filtration process, fine particles contained in the carbonic acid diester starting material are removed, and this process reduces the frequency at which the fluorinated resin membrane filter described below must be changed.

The filter used for filtration of the carbonic acid diester may be the same type as that used for filtration of the aforementioned bisphenol.

With respect to the aforementioned carbonic acid diester and bisphenol, the quantity of carbonic acid diester shall normally be 1.00 to 1.30 mol, preferably 1.01 to 1.20 mol per 1 mol of bisphenol.

At the time of mixing, a melt polycondensation catalyst may be included in the mixture of carbonic acid diester and bisphenol.

For the melt polycondensation catalyst, normally (a) an alkali metal compound and/or alkaline earth metal compound (hereinafter referred to as "(a) alkali (alkaline earth) metal compound") is used.

For the (a) alkali (alkaline earth) metal compound, the organic acid salts, inorganic acid salts, oxides, hydroxides, hydrides, or alcoholates of alkali metals and alkaline earth metals are preferred.

Specific examples of these compounds include sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenyl borate, sodium benzoate, potassium benzoate, lithium benzoate, disodium hydrogen phosphate, dipotassium hydrogen phosphate, dilithium hydrogen phosphate, the disodium, dipotassium, and dilithium salts of bisphenol A, and the sodium, potassium, and lithium salts of phenol compounds for the alkali metal compound; and calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate, etc. for the alkaline earth metal compound.

The alkali (alkaline earth) metal compound may be included in the polycondensation reaction mixture at a quantity of $1 \times 10^{-8}$ to $1 \times 10^{-3}$ mol, preferably $1 \times 10^{-7}$ to $2 \times 10^{-6}$ mol, and more preferably $1 \times 10^{-7}$ to $8 \times 10^{-7}$ per 1 mol of bisphenol. Moreover, if an alkali (alkaline earth) metal compound is already included in the bisphenol that is the starting material for the polycondensation reaction, the addition of alkali (alkaline earth) metal compound should be limited so that at the time of the polycondensation reaction the quantity lies within the aforementioned range with respect to 1 mol of bisphenol.

In addition to the aforementioned (a) alkali (alkaline earth) metal compound, a (b) basic compound may also be used as a polycondensation catalyst.

This kind of (b) basic compound comprises nitrogen-containing basic compounds that are either labile or volatile at high temperatures, and more specifically, this includes the following compounds.

Ammonium hydroxides that contain alkyl, aryl, and R-aryl groups such as tetramethylammonium hydroxide (Me$_4$NOH), tetraethylammonium hydroxide (Et$_4$NOH), tetrabutylammonium hydroxide (Bu$_4$NOH), and trimethylbenzylammonium hydroxide (C$_6$H$_3$(Me)$_3$NOH); tertiary amines such as trimethylamine, triethylamine, dimethylbenzylamine, triphenylamine, etc.; secondary amines represented by the formula R$_2$NH (wherein, R is an alkyl such as methyl, ethyl, etc., a phenyl group, a tolyl group, etc.); primary amines represented by the formula RNH$_2$ (wherein, R is an alkyl such as methyl, ethyl, etc., a phenyl group, a tolyl group, etc.); pyridines such as 4-dimethylamino pyridine, 4-diethylamino pyridine, 4-pyrrolidino pyridine, etc.; imidazoles such as 2-methyl imidazole, 2-phenyl imidazole, etc.; or basic salts such as ammonia, tetramethyl ammonium borohydride (Me$_4$NBH$_4$), tetrabutyl ammonium borohydride (Bu$_4$NBH$_4$), tetrabutyl ammonium tetraphenyl borate (Bu$_4$NBPh$_4$), tetramethyl ammonium tetraphenyl borate (Me$_4$NBPh$_4$), etc.

Among these, use of tetraalkyl ammonium hydroxides is preferred.

The (b) basic compound may be included in the polycondensation reaction mixture at a quantity of $1 \times 10^{-6}$ to $1 \times 10^{-1}$ mol, and preferably $1 \times 10^{-5}$ to $1 \times 10^{-2}$ mol per 1 mol of bisphenol.

Furthermore, a (c) boric acid compound may also be used as a catalyst.

The (c) boric acid compound comprises boric acid and boric acid esters, etc.

The term "boric acid esters" comprises boric acid esters with the following general formula.

$$B(OR)_n(OH)_{3-n}$$

(Wherein, R is an alkyl group such as a methyl or ethyl group, etc., or an aryl group such as a phenyl group, etc., and n represents the inters 1, 2, or 3.)

Specific examples of the boric acid ester include trimethyl borate, triethyl borate, tributyl borate, trihexyl borate, tripentyl borate, triphenyl borate, tritolyl borate and trinaphthyl borate, etc.

The (c) boric acid or boric acid ester may be included in the polycondensation reaction mixture at a quantity of $1 \times 10^{-8}$ to $1 \times 10^{-1}$ mol, preferably $1 \times 10^{-7}$ to $1 \times 10^{-2}$ mol, and more preferably $1 \times 10^{-6}$ to $1 \times 10^{-4}$ per 1 mol of bisphenol.

For the melt polycondensation catalyst in the present invention, for example, a combination of (a) alkali (alkaline earth) metal compound and (b) nitrogen-containing bask compound may be used, and a combination of all three, the (a) alkali (alkaline earth) metal compound, (b) nitrogen-containing basic compound and (c) boric acid or boric acid ester is preferred.

When the (a) alkali (alkaline earth) metal compound and (b) nitrogen-containing basic compound are used in combination in the aforementioned quantities as a catalyst, the polycondensation reaction will proceed at a sufficient rate and high-molecular weight polycarbonate will be produced with a high polymerization activity, which are preferred results.

Moreover, when the (a) alkali (alkaline earth) metal compound and (b) nitrogen-containing basic compound are used in combination or the (a) alkali (alkaline earth) metal compound and (c) boric acid or boric acid ester are used in combination, the individual catalysts may be mixed together and added to the molten mixture of bisphenol and carbonic acid diester, or they may be added separately to the molten mixture of bisphenol and carbonic acid diester.

Melt polycondensation of the bisphenol and carbonic acid diester is performed in the presence of the aforementioned melt polycondensation catalysts. Moreover, impurities such as particulate matter in the mix may be removed from the bisphenol and carbonic acid diester before polycondensation by a fluorinated-resin membrane filter.

The polycondensation reaction between the bisphenol and carbonic acid diester may be performed under the same polycondensation reaction conditions as those known from prior art, and for example, it may be performed using 2 or more reaction steps.

More specifically, the first reaction step may consist of reacting bisphenol and carbonic acid diester at normal pressure at 80° to 250°C., preferably 100° to 230° C., and more preferably 120° to 190° C. for 0.01 to 5 hours, preferably 0.01 to 4 hours, and more preferably 0.01 to 3 hours. Next the reaction temperature is increased while reducing the pressure of the reaction system, and the reaction between bisphenol and carbonic acid diester is continued toward a final polycondensation reaction between the bisphenol and carbonic acid diester under reduced pressure of less than 5 mmHg, preferably less than 1 mmHg, at 240° to 320° C.

The aforementioned polycondensation reaction may be performed by continuous or batch procedures. The reaction apparatus used in the reaction may consist of vats, piping, or a tower.

In the manufacture of the polycarbonate in the present invention, a polyfunctional compound having 3 or more functional groups per molecule may be used together with the bisphenol and carbonic acid diester. For the polyfunctional compound, compounds having phenolic hydroxyl groups or carboxyl groups are preferred, and compounds having 3 phenolic hydroxyl groups are especially preferred. Examples of these polyfunctional compounds include 1,1, 1-tris (4-hydroxyphenyl) ethane, 2,2",2'-tris (4-hydroxyphenyl) diisopropyl benzene, α-methyl-α,α', α"-tris (4-hydroxyphenyl)-1,4-diethyl benzene, α,α', α"-tris (4-hydroxyphenyl-1,3,5-triisopropyl benzene, phloroglucin, 4,6-dimethyl-2,4,6-tri (4-hydroxyphenyl)-heptane-2,1,3,5-tri (4-hydroxyphenyl) benzene, 2,2-bis-[4,4-(4,4'-dihydroxyphenyl)-cyclohexyl]-propane, trimellitic acid, 1,3, 5-benzene tricarboxylic acid, pyromellitic acid, etc.

Among these, 1,1,1-tris (4-hydroxyphenyl) ethane and α,α', α"-tris (4-hydroxyphenyl-1,3,5-triisopropyl benzene are preferred.

This polyfunctional compound is normally included in the reaction mixture at a quantity normally less than 0.03 mol, preferably 0.001 to 0.02 mol, and more preferably 0.001 to 0.01 mol per 1 mol of bisphenol.

In the manufacture of the polycarbonate, a terminal capping agent may be used together with the aforementioned aromatic dihydroxy compound and carbonic acid diester.

An aryloxy compound may be introduced onto the terminal molecule of the polycarbonate. This compound is represented by General Formula [III] below, and may be used as the terminal capping agent.

     [III]

(Wherein, Ar is an aromatic hydrocarbon of 6 to 50 carbon atoms.)

No particular restriction is placed on the carbohydrate group, which may be a phenyl group or a fused ring such as a naphthyl group or anthryl group. It may also be a ring formed by an aromatic ring and a saturated hydrocarbon and/or multiple atoms. These aromatic rings may be optionally substituted with halogen atoms or alkyl groups of 1 to 9 carbon atoms.

Specific examples of the aryloxy compound include phenol, diphenyl carbonate, p-tert-butylphenyl phenyl carbonate, p-tert-butylphenyl carbonate, p-cumenyl phenol, p cumenylphenyl phenyl carbonate, p-cumenylphenyl carbonate, and chroman compounds such as 2,2,4-trimethyl-4-(4-hydroxyphenyl) chroman, 2,2,4,6-tetramethyl-4-(3,5-dimethyl-4-hydroxyphenyl) chroman, 2,2,3-trimethyl-3-(4hydroxyphenyl) chroman, 2,2,3,6-tetramethyl-3-(3,5-dimethyl-4-hydroxyphenyl) chroman, 2,4,4-trimethyl-2-(2-hydroxyphenyl) chroman, 2,4,4,6-tetramethyl-2-(3,5-dimethyl-2-hydroxyphenyl) chroman, etc.

The aforementioned aryloxy compounds may be used alone or may be used in combinations of two or more.

The aryloxy compound may normally be included in the reaction mixture at a quantity of 0.01 to 0.2 mol, preferably 0.02 to 0.15 mol, and more preferably 0.02 to 0.1 mol per 1 mol of aromatic dihydroxy compound.

By using the aryloxy compound as a terminal capping agent at this quantity, the terminal end(s) of the obtained polycarbonate will be capped by the terminal group represented in General Formula [I] above at a rate of 1% to 95%, preferably 10% to 95%, and more preferably 20% to 90%.

A polycarbonate into which the terminal group represented by General Formula [I] above is introduced at the above ratio will have excellent heat resistance, and excellent mechanical properties such as impact resistance even at low molecular weights.

In the present invention an aliphatic monocarboxylic acid compound, by which the aliphatic hydrocarbon unit shown in General Formula [IV] below may be introduced, may be used as needed together with the aryloxy compound as a terminal capping agent.

     [IV]

(Wherein R is a branched or straight-chain alkyl group of 10 to 30 carbon atoms with optional halogen substitution.)

Specific examples of this aliphatic monocarboxylic acid compound include alkyl-monocarboxylic acids such as undecanoic acid, lauric acid, tridecanoic acid, pentadecanoic acid, palmitic acid, heptadecanoic acid, stearic acid, nonadecanoic acid, heneicosanoic acid, tricosanoic acid, melissic acid, etc., and the alkyl-monocarboxylic acid esters of the aforementioned alkyl-monocarboxylic acids, for example, the methyl, ethyl, and phenyl esters such as methyl stearate, ethyl stearate, phenyl stearate, etc.

The aliphatic monocarboxylic acid compound may be used alone or in combinations of two or more.

The aliphatic monocarboxylic acid compound may normally be included in the reaction mixture at a quantity of 0.01 to 0.20 mol, preferably 0.02 to 0.15 mol, and more preferably 0.02 to 0.10 mol per 1 mol of aromatic dihydroxy compound.

Moreover, if the total quantity of flie above terminal capping agents exceeds 0.2 mol per 1 mol of aromatic dihydroxy compound, the rate of polymerization will be decreased.

The measured intrinsic viscosity of the reaction product thus obtained (polycarbonate) in methylene chloride at 20° C. will normally be 0.10 to 1.0 dL/g, and preferably 0.30 to 0.65 dL/g.

The preferred melt flow rate of this reaction product (polycarbonate) will be 1 to 70 g/10 min, preferably 2 to 50 g/10 min, measured at a temperature of 300° C. and a load of 1.2 kg in high-viscosity products, and 5 to 20 g/10 min, preferably 8 to 16 g/10 min, measured at a temperature of 250° C. and a load of 1.2 kg in low-viscosity products.

The sulfur-containing acidic compound and/or derivative formed from said acidic compound with a pKa value of less than 3 (hereinafter referred to as the acidic compound) described below is added to constituent (A) polycarbonate used in the present invention immediately after the polycondensation reaction without cooling the reaction product obtained in the manner described above.

The sulfur-containing acidic compound and derivative formed from said acidic compound may include sulfurous acid, sulfuric acid, sulfinic acid compounds, and sulfonic acid compounds and their derivatives. Specific examples of sulfurous acid derivatives include dimethyl sulfite, diethyl sulfite, dipropyl sulfite, dibutyl sulfite, diphenyl sulfite, etc.

Specific examples of sulfuric acid derivatives include dimethyl sulfate, diethyl sulfate, dipropyl sulfate, dibutyl sulfate, diphenyl sulfate, etc.

Specific examples of sulfinic acid compounds include benzene sulfinic acid, toluene sulfinic acid, naphthalene sulfinic acid, etc.

Specific examples of sulfonic acid compounds and their derivatives include the compounds shown in General Formula [V] below and their ammonium salts.

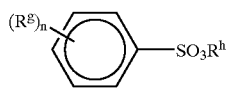

[V]

(Wherein, $R^g$ is a hydrocarbon or optionally substituted hydrocarbon group of 1 to 50 carbon atoms, $R^h$ is a hydrogen atom or hydrocarbon or optionally substituted hydrocarbon group of 1 to 50 carbon atoms, and n is an integer from 0 to 3.)

Examples of this kind of sulfonic acid compound and its derivatives include sulfonic acids such as benzene sulfonic acid, p-toluene sulfonic acid, etc., sulfonic acid esters such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate, etc., and ammonium sulfonates such as ammonium p-toluenesulfonate.

In addition, sulfonic acid compounds such as trifluoromethane sulfonic acid, naphthalene sulfonic acid, sulfonated polystyrene, methyl acrylate-sulfonated styrene copolymer, etc., may be used.

These compounds may be used in combinations of two or more.

The sulfonic acid compound shown in General Formula [V] above and its derivatives are preferred as the acidic compound.

In General Formula [V] above, the ester compound in which $R^g$ is a substituted aliphatic hydrocarbon of 1 to 6 carbon atoms, $R^h$ is a substituted aliphatic hydrocarbon group of 1 to 8 carbon atoms, and n is an integer from 0 to 3 is especially preferred, and more specifically, ethyl benzenesulfonate, butyl benzenesulfonate, methyl p-toluenesulfonate, ethyl p-toluenesulfonate, and butyl p-toluenesulfonate are preferred.

Among these compounds, methyl p-toluenesulfonate, ethyl p-toluenesulfonate, and butyl p-toluenesulfonate are especially preferred.

These compounds may also be used in combinations of two or more.

Constituent (A) polycarbonate used in the present invention contains 0.1 to 4.5 ppm, preferably 0.2 to 3 ppm of the aforementioned acidic compound with respect to the total reaction product.

When the acidic compound is blended into the reaction product (polycarbonate) in this quantity, the alkalinity of the alkali (alkaline earth) metal catalyst remaining in the polycarbonate will be neutralized or weakened, and ultimately a polycarbonate can be obtained with improved retention stability and water resistance.

Water may also be added together with the aforementioned acidic compound. The quantity of added water should be 5 to 1000 ppm, preferably 10 to 500 ppm, and more preferably 20 to 300 ppm with respect to the total reaction product (polycarbonate).

Kneading of the reaction product and the acidic compound may be performed in a conventional kneading machine such as a single screw extruder, twin screw extruder, static mixer, etc., and this mixer can be used effectively with or without vents. More specifically, it is preferred that the acidic compound and water be added to the reaction product obtained by the polycondensation reaction while it is in the molten state in the reaction vessel or extruder.

More specifically, the polycarbonate may be obtained by adding the acidic compound and, when necessary, the water to the reaction product obtained from the polycondensation reaction while it is in the reaction vessel, forming the polycarbonate, and pelletizing it by passing it through an extruder, or the polycarbonate may be obtained by adding the acidic compound and water to the polycarbonate obtained from the polycondensation reaction and mixing it as the polycarbonate is being passed from the reaction vessel to the extruder and pelletized.

In the present invention, while the polycarbonate reaction product is in the molten state it may be processed by passing it through a filter. Foreign substances such as gels formed during the polycondensation reaction can be removed by this filtration process.

The filtration process can be performed after the acidic compound, etc., is added to the reaction product and mixed with it.

No particular restriction is placed on the filter used in this bisphenol filtration process, and conventional, widely used filters are suitable. More specifically, candle type, pleated type, leaf type and other types of filters may be used. These filters should have an absolute filtering precision (pore size) of 50 μm or less, and preferably 20 μm or less. When these kinds of filters are used, the retention time of the polycarbonate during filtration can be reduced, and this can prevent heat degradation of the polycarbonate. This also enables use of filters with a long lifetime.

Polycarbonate Resin Composition

The polycarbonate resin composition for optical use in the present invention is one in which constituents (B) phosphorous acid, (C) a sulfur-containing acidic compound or its derivative having a pKa of less than 3, and (D) an ester derived from a mono-fatty acid of 10 to 22 carbon atoms and a polyhydric alcohol are blended into constituent (A) polycarbonate.

For constituent (B) phosphorous acid, a salt may be used such as the sodium salt, potassium salt, etc. The content of constituent (B) phosphorous acid should be 0.1 to 10 ppm, preferably 0.2 to 5 ppm, with respect to constituent (A) polycarbonate. When this quantity of constituent (B) phosphorous acid is included, various types of undesirable effects originating from heavy metal ion impurities in the mix can be prevented. Constituent B may be added together with the aforementioned acidic compound to the polycarbonate after the reaction is completed.

Moreover, the same concept applies to constituent (C), sulfur-containing acidic compound or its derivative with a pKa of less than 3, as to the acidic compound contained in constituent (A) polycarbonate noted above. The content of constituent (C) acidic compound should be 0.1 to 3 ppm, preferably 0.2 to 3 ppm with respect to constituent (A)

polycarbonate. It is known from prior art that addition of constituent (C) acidic compound is performed to deactivate the melt polycondensation catalyst, and after the catalyst has been deactivated further addition of a specified quantity of constituent (C) acidic compound can suppress discoloration of the polycarbonate due to heating during the forming process.

For constituent (D) an ester derived from a mono-fatty acid of 10 to 22 carbon atoms and a polyhydric alcohol, a partial ester derived from a mono-fatty acid of 10 to 22 carbon atoms such as myristic acid, palmitic acid, stearic acid, oleic acid, behenic acid, sulfur-containing fatty acids from fish oil, etc., and a polyhydric alcohol such as ethylene glycol, glycerin, pentaerythritol, etc., is used either alone or as a mixture. The esterification rate should be within the range of 10% to 80%, and preferably 20% to 60%, when the esterification rate for total esterification of the polyhydric alcohol equals 100%. This constituent (D) ester may be either a complete or partial condensate. The quantity of constituent (D) ester in the mix is preferably 10 to 1000 ppm with respect to constituent (A) polycarbonate. This quantity of constituent (D) ester is included because if the amount of constituent (D) ester is less than 10 ppm the release properties are decreased during molding of the molten product, and optical deformities result due to clouding of the molded product and distortion upon release from the mold; if the amount is greater than 1000 ppm, the product will undergo thermal decomposition during molding of the molten product causing silver-streaking on the product and contamination of the base plate and stamper.

Moreover, in addition to aforementioned constituents (B) through (D), constituent (E), at least one type of compound selected from a group consisting of phosphorous acid ester and trimethyl phosphate, may be included in the polycarbonate resin for optical use in the present invention. The content of constituent (E) should be 10 to 1000 ppm, preferably 10 to 500 ppm with respect to constituent (A) polycarbonate.

The phosphorous acid ester includes compounds with the general formula shown below.

P(OR)$_3$ (wherein, R is an alicyclic hydrocarbon group, aliphatic hydrocarbon group or aromatic hydrocarbon group. These substituents may be the same or different.)

Compounds represented by this formula include, for example, trialkyl phosphites such as trimethyl phosphite, triethyl phosphite, tributyl phosphite, trioctyl phosphite, tris (2-thylhexyl) phosphite, trinonyl phosphite, tridecyl phosphite, trioctadecyl phosphite, tristearyl phosphite, tris (2-chloroethyl) phosphite, tris (2,3-dichloropropyl) phosphite, etc., tricycloalkyl phosphites such as tricyclohexyl phosphite, triaryl phosphites such as triphenyl phosphite, tricresyl phosphite, tris (ethylphenyl) phosphite, tris (2,4-di-t-butylphenyl) phosphite, tris (nonylphenyl) phosphite, tris (hydroxyphenyl) phosphite, etc., and arylalkyl phosphites such as phenyldidecyl phosphite, diphenyldecyl phosphite, diphenylisooctyl phosphite, phenyisooctyl phosphite, 2-ethylhexyldiphenyl phosphite etc.

In addition, the phosphorous acid includes, for example, distearyl pentaerythrityl diphosphite, bis (2,4-di-t-butylphenyl) pentaerythrityl diphosphite, etc.

Among these, the phosphorous acid ester shown in the above general formula is preferred, the aromatic phosphorous acid ester is more preferred, and tris (2,4-di-t-butylphenyl) phosphite is especially preferred.

In addition, the polycarbonate resin composition for optical use in the present invention may contain constituent (F) an ester derived from a mono-fatty acid of 8 to 22 carbon atoms and polyethylene glycol.

The content of constituent (F) should be 50 to 1000 ppm, preferably 50 to 500 ppm with respect to constituent (A) polycarbonate.

Examples of constituent (F) include, for example, monoesters, diesters or mixtures of monoesters and diesters formed from fatty acids such as caproic acid, lauric acid, myristic acid, palmitic acid, stearic acid, behenic acid, etc., and polyethylene glycol having 2 to 20 ethylene glycol units.

The kneading of constituent (A) polycarbonate, constituents (B) through (D) and constituents (E) and (F) is performed by a conventional kneading machine such as a single screw extruder, twin screw extruder, static mixer, etc., and this mixer can be used effectively with or without vents. For example, the polycarbonate may be obtained by adding constituents (B) through (D) and constituents (E) and (F) to the reaction product obtained from the polycondensation reaction while it is in the reaction vessel, forming the polycarbonate, and pelletizing it by passing it through an extruder, or the polycarbonate may be obtained by adding constituents (B) through (D) and constituents (E) and (F) to the polycarbonate obtained from the polycondensation reaction and mixing it as the polycarbonate is being pelletized.

Generally speaking, when polycarbonate is used in manufacturing, polycarbonate pellets are re-melted and various additives such as heat stabilizers are mixed in. Because pellets of the polycarbonate resin composition in the present invention contain aforementioned constituents (B) through (D) as essential constituents in specified quantities, even when they are re-melted for the purpose of mixing in various additives and molding, the thermal stability is improved and retention stability is excellent in the molten state; therefore, thermal decomposition due to melting is especially limited, the molecular weight tends not to decrease, and discoloration does not easily occur.

In the present invention, constituent [G] additives may be added to the polycarbonate resin composition to the extent that the object of the present invention is not compromised.

This constituent [G] additives may be added to polycarbonate in the molten state at the same time as constituents (B) through (D), and constituents (E) and (F) are added, or constituent [G] may be added independently. In the present invention, items listed below in constituent [G] additives that are reactive should be added after constituent [G] acidic compound is added.

Constituent [C] additives used in the present invention includes widely used additives that are conventionally added to polycarbonate depending on the intended purpose, and they may include heat stabilizers, epoxy compounds, UV-radiation absorbing agents, mold release agents, colorants, anti-static agents, slip agents, anti-blocking agents, lubricants, anti-clouding agents, synthetic oils, waxes, organic fillers, inorganic fillers, etc.

Among these the heat stabilizers, epoxy compounds, UV-radiation absorbing agents, mold release agents, colorants, etc., mentioned below are preferred. Two or more of these may be used concurrently.

The polycarbonate resin composition of the type described in the present invention may be pellitized as desired and used for a variety of applications. The polycarbonate resin composition in the present invention is most suitable for optical materials, and especially as a molding material for optical disks because of its excellent molding properties and color stability during molding.

The polycarbonate resin composition in the present invention has excellent transparency, color tone, heat resistance and water resistance.

The type of polycarbonate resin composition in the present invention may, of course, be used for general molded materials, and it is most suitable for building materials such as sheeting, headlight lenses for automobiles, optical lenses for glasses, etc., and optical recording materials, and it is especially suited as a molding material for optical disks.

EXAMPLES

The present invention is described in greater detail below through examples, but the present invention is by no means limited to these examples.

Reference Examples 1–4

Continuous polymerization of bisphenol A (GE Plastics, Japan) and diphenyl carbonate (Enikemu) was performed according to the procedure described in JP Kokai 93-239334, and at the final step 7 ppm of butyl p-toluenesulfonate was added to prepare constituent (A) polycarbonate. After the addition of 2 ppm constituent (B) phosphorous acid with respect to the obtained constituent (A) polycarbonate (PS-converted weight-average molecular weight of polycarbonate: 17,500), constituent (D) glycerin monostearate (hereinafter abbreviated GMS), constituent (F) polyoxyethylene fatty acid ester (hereinafter abbreviated Atmer), constituent (C) butyl p-toluenesulfonate, and constituent (E) tris (nonylphenyl) phosphite (hereinafter abbreviated TNP), trimethyl phosphate, or phosphoric acid ester (tris (2,4-di-t-butylphenyl) phosphite, hereinafter abbreviated TBPP) were added in the quantities shown in Table 1, and after melting and kneading polycarbonate resin composition pellets were obtained using a single screw extruder.

Using the polycarbonate resin composition pellets thus obtained, a 120 mm diameter CD was molded at a cylinder temperature of 380° C.

As an evaluation of color tone stability of the CD, the change in color after 10 min of retention at 380° C. was measured from Delta YI.

The Delta YI value was obtained by subtraction of the YI after the 10 min retention at 380° C. from the pre-retention YI value.

The results are shown in Table 1.

TABLE 1

| | (B) Phosphorous acid | (C) butyl p-toluene-sulfonate | (D) GMS | (E) TNP | (E) TMP | (E) TBPP | (F) Atmer | Delta YI |
|---|---|---|---|---|---|---|---|---|
| Ref. Ex. 1 | 2 | | 400 | | | 100 | 200 | 3.87 |
| Ref. Ex. 2 | | 3.6 | 400 | | | 100 | 200 | 3.04 |
| Ref. Ex. 3 | | | 400 | 36 | 15 | 100 | 200 | 1.98 |
| Ref. Ex. 4 | | | 400 | | | 100 | 200 | 3.44 |

GMS: glycerin monostearate
Atmer: polyoxyethylene fatty acid made by ICI
TNP: tris (nonylphenyl) phosphite
TMP: trimethyl phosphate
TBPP: tris (2,4-di-t-butylphenyl) phosphite

Example 1

Continuous polymerization of bisphenol A (GE Plastics, Japan) and diphenyl carbonate (Enikemu) was performed according to the procedure described in JP Kokai 93-239334, and at the final step 7 ppm of butyl p-toluenesulfonate and 2 ppm constituent (B) phosphorous acid were blended into the mixture to prepare constituent (A) polycarbonate (PS-converted weight-average molecular weight of polycarbonate: 17,500); constituent (D) GMS, constituent (F) Atmer, and constituent (C) butyl p-toluenesulfonate were added in the quantities shown in Table 2, and after melting and kneading polycarbonate resin composition pellets were obtained using a single screw extruder.

Using the polycarbonate resin composition pellets thus obtained, a 120 mm diameter CD was molded at a cylinder temperature of 380°C., and as an evaluation of color tone stability of the CD, the change in color after 10 min of retention at 380° C. was measured from Delta YI.

The results are shown in Table 2.

Examples 2 & 3, Comparative Examples 1 & 2

Polycarbonate resin composition pellets were prepared in the same manner as in Example 1 except that the quantities of constituent (F) Atmer and constituent (C) butyl p-toluenesulfonate used in Example 1 were changed as shown in Table 2. The pellets that were obtained were evaluated using The results are shown in Table 2. Delta YI in the same manner as in Example 1.

TABLE 2

| | (B) Phosphorous acid | (C) butyl p-toluene-sulfonate | (D) GMS | (F) Atmer | Delta YI |
|---|---|---|---|---|---|
| Example 1 | 2 | 2 | 400 | 0 | 1.2 |
| Example 2 | 2 | 1 | 400 | 75 | 1.61 |
| Example 3 | 2 | 2 | 400 | 150 | 1.31 |
| Comp. Ex. 1 | 2 | | 400 | 0 | 2.09 |
| Comp. Ex. 2 | 2 | | 400 | 150 | 2.3 |

As can be clearly seen from Table 2, a polycarbonate resin composition showing excellent color tone stability can be obtained by the addition of the acidic compound.

Example 4

Polycarbonate resin composition pellets were prepared in the same manner as in Example 1 except that the quantities of constituent (D) GMS, constituent (F) Atmer, and constituent (C) butyl p-toluenesulfonate were changed as shown in Table 3. The pellets that were obtained were evaluated using Delta YI in the same manner as in Example 1.

Examples 5 & 6, Comparative Examples 3 & 4

Polycarbonate resin composition pellets were prepared in the same manner as in Example 4 except that the quantities of constituent (E) phosphorous acid ester (TBPP), constituent (F) Atmer, and constituent (C) butyl p-toluenesulfonate used in Example 4 were changed as shown in Table 3. The pellets that were obtained were evaluated using Delta YI in the same manner as in Example 4.

The results are shown in Table 3

TABLE 3

|  | (B) Phosphorous acid | (C) butyl p-toluene-sulfonate | (D) GMS | (E) Phosphorous acid ester | (F) Atmer | Delta YI |
|---|---|---|---|---|---|---|
| Example 4 | 2 | 2 | 200 |  | 200 | 1.52 |
| Example 5 | 2 | 1 | 400 | 100 | 200 | 2.52 |
| Example 6 | 2 | 2 | 400 | 100 | 200 | 2.16 |
| Comp. Ex. 3 | 2 |  | 200 | 100 | 200 | 2.67 |
| Comp. Ex. 4 | 2 |  | 400 | 100 | 200 | 3.16 |

Phosphorous acid ester = TBPP: tris (2,4-di-t-butylphenyl) phosphite

Examples 7 & 8

Continuous polymerization of bisphenol A and diphenyl carbonate was performed according to the procedure described in Example 1, and at the final step 4 ppm of butyl p-toluenesulfonate was blended into the mixture to prepare constituent (A) polycarbonate. After unreacted monomer was removed from the obtained constituent (A) polycarbonate under reduced pressure, 2 ppm of constituent (B) phosphorous acid was blended into constituent (A) polycarbonate, and constituent (D) glycerine monostearate, constituent (F) polyoxyethylene fatty acid ester, and constituent (C) butyl p-toluenesulfonate were added in the quantities shown in Table 4, and after melting and kneading polycarbonate resin composition pellets were obtained using a single screw extruder. Using the pellets thus obtained, Delta YI was evaluated in the same manner as in Example 1.

The results are shown in Table 4.

Comparative Examples 5 & 6

At the final step 7 ppm of butyl p-toluenesulfonate was added to constituent (A) polycarbonate described in Examples 7 & 8, and this was used as constituent (A) polycarbonate; then 2 ppm of constituent (B) phosphorous acid was blended into constituent (A) polycarbonate, constituent (D) glycerine monostearate and constituent (F) polyoxyethylene fatty acid ester were added in the quantities shown in Table 4, and after melting and kneading polycarbonate resin composition pellets were obtained using a single screw extruder. Using the pellets thus obtained, Delta YI was evaluated in the same manner as in Examples 7 & 8.

The results are shown in Table 4.

TABLE 4

|  | (B) Phosphorous acid | (C) Acidic compound A | (C) Acidic Compound B | (D) GMS | (F) Atmer | Delta YI |
|---|---|---|---|---|---|---|
| Comp. Ex. 5 | 2 | 7 | 0 | 400 | 0 | 2.09 |
| Comp. Ex. 6 | 2 | 7 | 0 | 400 | 250 | 2.69 |
| Example 7 | 2 | 4 | 2 | 400 | 200 | 1.37 |
| Example 8 | 2 | 4 | 2 | 400 | 150 | 1.42 |

(Three different samples each of Examples 7 & 8 and Comparative Examples 5 & 6 were prepared. In the table the Delta YI value represents the mean value of the 3 samples.)

What is claimed is:

1. A polycarbonate resin composition for optical use comprising:

(A) polycarbonate prepared by melt polycondensing a bisphenol and a carbonic acid diester in the presence of an alkaline catalyst, to form a reaction product, and subsequently adding 0.1 to 4.5 ppm of a sulfur-containing acidic compound, or a derivative of the acidic compound which has a pKa of less than 3, to the reaction product, (B) phosphorous acid, (C) a sulfur-containing acidic compound or its derivative having a pKa of less than 3, and (D) an ester derived from a mono-fatty acid of 10 to 22 carbon atoms and a polyhydric alcohol, wherein with respect to the polycarbonate constituent (A), the content of the phosphorous acid constituent (B) in the composition is 0.1 to 10 ppm, the content of the acidic compound constituent (C) in the composition is 0.1 to 3 ppm, and the content of the ester constituent (D) in the composition is 50 to 1000 ppm.

2. The polycarbonate resin composition for optical use according to claim 1, which further comprises 10 to 1000 ppm of a constituent (E), wherein constituent (E) comprises at least one type of compound selected from a group consisting of phosphorous acid ester and trimethyl phosphate.

3. The polycarbonate resin composition for optical use according to claim 1, which further comprises 50 to 500 ppm of constituent (F), wherein constituent (F) comprises an ester derived from a mono-fatty acid of 8 to 22 carbon atoms and polyethylene glycol.

4. The polycarbonate resin composition for optical use according to claim 2, which further comprises 50 to 500 ppm of constituent (F), wherein constituent (F) comprises an ester derived from a mono-fatty acid of 8 to 22 carbon atoms and polyethylene glycol.

5. A process for preparing a polycarbonate resin, which process comprises:

(A) melt polycondensing a bisphenol and a carbonic acid diester in the presence of an alkaline catalyst to form a reaction product, and subsequently adding a sufficient amount of sulfur-containing acidic compound to neutralize or weaken said catalyst, thereby forming a reaction product, (B) adding to said reaction product,
  (i) phosphorous acid
  (ii) a sulfur-containing acidic compound, or its derivative having a pKa of less than 3, and
  (iii) an ester derived from a mono-fatty acid of 10 to 22 carbon atoms and a polyhydric alcohol, wherein, in said resin, with respect to said reaction product, the content of phosphorous acid is 0.1 to 10 ppm, the content of the sulfur-containing acid compound is 0.1 to 3 ppm, and the content of the ester is 50 to 1,000 ppm.

* * * * *